(12) United States Patent
Boulton et al.

(10) Patent No.: US 11,210,405 B2
(45) Date of Patent: Dec. 28, 2021

(54) BINARY VULNERABILITY DETERMINATION

(71) Applicant: BlackBerry Limited, Waterloo (CA)

(72) Inventors: Adam John Boulton, Wirral (GB); William James McCourt, Livingston (GB); Benjamin John Godwood, Chipping Norton (GB); Paul Compton Hirst, Tiverton (GB)

(73) Assignee: BlackBerry Limited, Waterloo (CA)

( * ) Notice: Subject to any disclaimer, the term of this patent is extended or adjusted under 35 U.S.C. 154(b) by 170 days.

(21) Appl. No.: 16/667,896

(22) Filed: Oct. 29, 2019

(65) Prior Publication Data
US 2021/0034757 A1 Feb. 4, 2021

Related U.S. Application Data

(60) Provisional application No. 62/881,076, filed on Jul. 31, 2019.

(51) Int. Cl.
| | | |
|---|---|---|
| *G06F 21/00* | (2013.01) | |
| *G06F 21/57* | (2013.01) | |
| *G06F 8/53* | (2018.01) | |
| *G06F 21/56* | (2013.01) | |

(52) U.S. Cl.
CPC .............. *G06F 21/577* (2013.01); *G06F 8/53* (2013.01); *G06F 21/562* (2013.01); *G06F 21/566* (2013.01)

(58) Field of Classification Search
CPC ........ G06F 21/50; G06F 21/56; G06F 21/562; G06F 21/563; G06F 21/566; G06F 21/57; G06F 21/577; G06F 8/53
See application file for complete search history.

(56) References Cited

U.S. PATENT DOCUMENTS

| | | | |
|---|---|---|---|
| 8,539,449 B2 | 9/2013 | Kim et al. | |
| 8,789,192 B2 | 7/2014 | LaBumbard | |
| 9,317,692 B2 | 4/2016 | Elder et al. | |
| 9,871,815 B2 | 1/2018 | Ouchn | |
| 9,928,369 B2 | 3/2018 | Grieco et al. | |
| 2004/0111713 A1* | 6/2004 | Rioux | G06F 8/53 717/137 |
| 2012/0304300 A1* | 11/2012 | LaBumbard | G06F 21/577 726/25 |
| 2017/0316213 A1 | 11/2017 | McClintock et al. | |
| 2018/0129812 A1* | 5/2018 | Kang | G06F 21/577 |
| 2019/0102564 A1* | 4/2019 | Li | G06N 5/045 |
| 2021/0133330 A1 | 5/2021 | Boulton et al. | |

OTHER PUBLICATIONS

Khazaei, Atefeh & Ghasemzadeh, Mohammad & Derhami, Vali. An automatic method for CVSS score prediction using vulnerabilities description. Journal of Intelligent & Fuzzy Systems 30 (2016) 89-96. 10.3233/IFS-151733. IOS Press.

(Continued)

*Primary Examiner* — Edward Zee
(74) *Attorney, Agent, or Firm* — Fish & Richardson P.C.

(57) ABSTRACT

A method of determining a severity score is disclosed. The method includes receiving a binary; using the binary, determining a plurality of vulnerability parameters; and generating a report based on the plurality of vulnerability parameters.

12 Claims, 4 Drawing Sheets

(56) References Cited

OTHER PUBLICATIONS

Extended European Search Report issued in European Application No. 20199109.8 dated Jan. 13, 2021, 8 pages.
Cve.mitre.org [online], "CVE" Nov. 1999, [retrieved on Jul. 21, 2021], retrieved from: URL <https://cve.mitre.org/>, 2 pages.
First.org [online], "Common Vulnerability Scoring System v3.0Examples" Sep. 2017, [retrieved on Jul. 21, 2021], Yetrieved from: URL <https://www.first.org/cvss/v3.0/cvss-v30-examples_v1.5.pdf>, 38 pages.
First.org [online], "Common Vulnerability Scoring System Version 3.0 Calculator" Jan. 2015, [retrieved on Jul. 21, 2021], retrieved from : URL <www.first.org/cvss/calculator/3.0>, 4 pages.
First.org [online], "Common Vulnerability Scoring System version 3.1: Specification Document" Jun. 2019, [retrieved on Jul. 21, 2021], retrieved from: URL <https://www.first.org/cvss/specification-document>, 24 pages.
Security-database.com [online], "CVE-2018-3877" Sep. 2018 [retrieved on Jul. 21, 2021], retrieved from : URL <https://www.security-database.com/detail.php?alert=CVE-2018-3877>, 3 pages.
Wikipedia.org [online], "Common Vulnerability Scoring System" Nov. 2006 [retrieved on Jul. 21, 2021], retrieved from : URL <https://en.wikipedia.org/wiki/Common_Vulnerability_Scoring_System>, 8 pages.

* cited by examiner

BINARY VULNERABILITY DETERMINATION

CROSS-REFERENCE TO RELATED APPLICATIONS

This application claims the benefit of priority to U.S. Provisional Patent Application Ser. No. 62/881,076 filed on Jul. 31, 2019, which is hereby incorporated by reference.

TECHNICAL FIELD

The present disclosure relates to determining a software vulnerability by analyzing a binary.

BACKGROUND

A binary is a type of computer file in a computer-readable format. Rather than store data as text, a binary file stores data as a string of binary digits, such as a sequence of bytes. A program written in source code (a human-readable format) can be compiled into a binary so the computer can execute the program. While not typically stored in a human-readable format, the data in a binary can be represented as text in formats such as hexadecimal, decimal, binary, ASCII, etc.

DETAILED DESCRIPTION

According to at least one illustrative example, a method of determining a severity score comprise: receiving a binary; using the binary, determining a plurality of vulnerability parameters; and generating a report based on the plurality of vulnerability parameters.

According to the at least one example set forth above, the severity score is a common vulnerability scoring system (CVSS) severity score.

According to the at least one example set forth above, the method further comprises: merging a public common vulnerability and exposures (CVE) dataset with a private CVE dataset; and based on the plurality of vulnerability parameters, using the merged public and private CVE datasets to determine a common vulnerability scoring system (CVSS) severity score.

According to the at least one example set forth above, the method the vulnerability parameters include an attack vector (AV), an attack complexity (AC), a privileges required (PR), a user interaction (UI), a scope (S), a confidentiality (C), an integrity (I), and an availability (A).

According to the at least one example set forth above, the vulnerability parameters include an exploit code maturity (E), a remediation level (RL), and a report confidence (RC).

According to the at least one example set forth above, the vulnerability parameters include a confidentiality requirement (CR), an integrity requirement (IR), an availability requirement (AR), a modified attack vector (MAV), a modified attack complexity (MAC), a modified privileges required (MPR), a modified user interaction (MUI), a modified scope (MS), a modified confidentiality (MC), a modified integrity (MI), and a modified availability (MA).

According to the at least one example set forth above, the determining a plurality of vulnerability parameters comprises disassembling or decompiling the binary.

According to the at least one example set forth above, the method further comprises: based on the disassembled or decompiled binary, identifying and evaluating at least a portion of a source code or one or more function calls to determine at least one of the plurality of vulnerability parameters.

According to at least one additional illustrative example, a server comprises: a processor; and memory, the processor being coupled to the memory, the processor executing instructions stored in memory, the instructions comprising to: receive a binary; using the binary, determine a plurality of vulnerability parameters; and generate a report based on the plurality of vulnerability parameters.

According to the at least one server example set forth above, the severity score is a common vulnerability scoring system (CVSS) severity score.

According to the at least one server example set forth above, the instructions further comprise to: merge a public common vulnerability and exposures (CVE) dataset with a private CVE dataset; and based on the plurality of vulnerability parameters, use the merged public and private CVE datasets to determine a common vulnerability scoring system (CVSS) severity score.

According to the at least one server example set forth above, the vulnerability parameters include an attack vector (AV), an attack complexity (AC), a privileges required (PR), a user interaction (UI), a scope (S), a confidentiality (C), an integrity (I), and an availability (A).

According to the at least one server example set forth above, the vulnerability parameters include an exploit code maturity (E), a remediation level (RL), and a report confidence (RC).

According to the at least one server example set forth above, the vulnerability parameters include a confidentiality requirement (CR), an integrity requirement (IR), an availability requirement (AR), a modified attack vector (MAV), a modified attack complexity (MAC), a modified privileges required (MPR), a modified user interaction (MUI), a modified scope (MS), a modified confidentiality (MC), a modified integrity (MI), and a modified availability (MA).

According to the at least one server example set forth above, the instructions further comprise to: disassemble or decompile the binary.

According to the at least one server example set forth above, the instructions further comprise to: based on the disassembled or decompiled binary, identify and evaluate at least a portion of a source code or one or more function calls to determine at least one of the plurality of vulnerability parameters.

According to the at least one example set forth above, a computing device comprising at least one processor and memory is disclosed that is programmed to execute any combination of the examples of the method(s) set forth above.

According to the at least one example, a computer program product is disclosed that includes a computer readable medium that stores instructions which are executable by at least one computer processor, wherein the instructions of the computer program product include any combination of the examples of the method(s) set forth above and/or any combination of the instructions executable by the at least one processor, as set forth above and herein.

Figure 1:
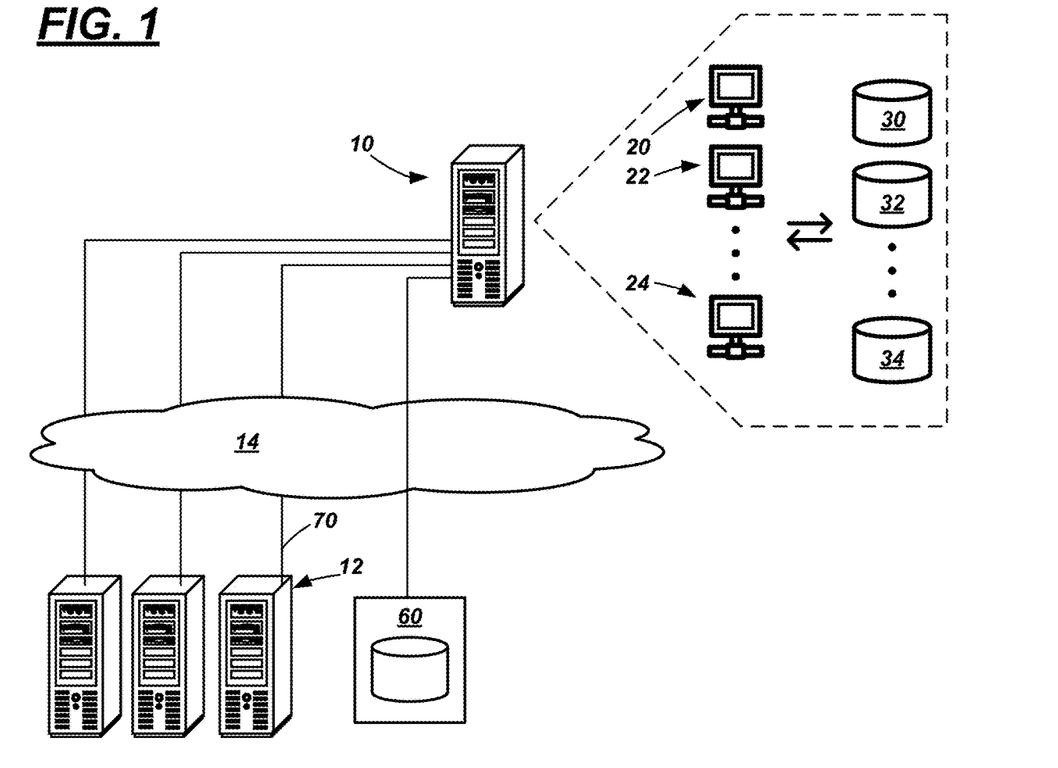
FIG. 1 is a schematic diagram illustrating a server in communication with multiple customer computers, the server comprising one or more networked computers.
Figure 2:
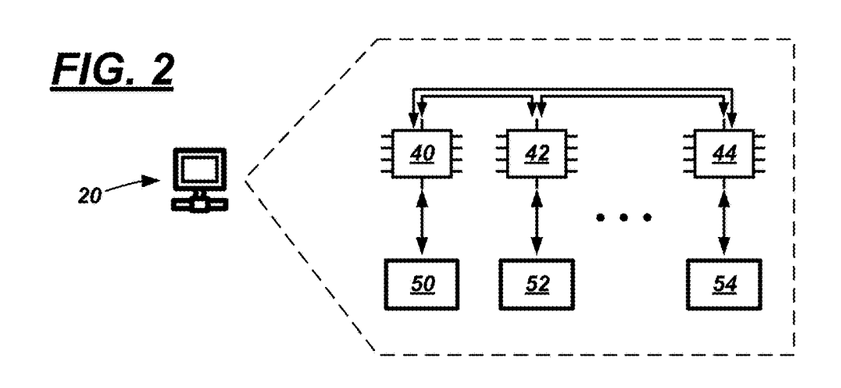
FIG. 2 is a schematic diagram illustrating an example of a networked computer.

As shown in FIGS. 1-2, wherein like reference numerals indicate like or similar features and/or functions, a software vulnerability testing server 10 is shown that can evaluate a binary and determine weaknesses, vulnerabilities, and susceptibilities of the binary to malicious attack. In the present context, a binary refers to compiled source code, wherein, in a compiled state, the binary comprises 1's and 0's. And as used herein, compiling (or being 'compiled') refers to using a compiler (i.e., a software algorithm which converts an inputted software from one programming code to another programming code (e.g., in this case, a binary code)). A binary may be associated with all or only a portion of a compiled software program. Thus, as will be described in greater detail below, the server 10 may provide a service to customers that develop software programs as at least a portion of their business model. These customers may develop enterprise software, software-as-a-service (SAAS), integrated software (e.g., for computer hardware modules or electronic circuits), or the like. For example, server 10 may receive a binary from a respective customer computer, and server 10 may extract a plurality of common vulnerability scoring system (CVSS) parameters. More precisely, in one embodiment of the disclosure, the server 10 can perform an analysis of the binary for identifying calls to known Commercial off-the-shelf (COTS) products or software products. Then, the server 10 can perform a search in a public common vulnerability and exposures (CVE) dataset for recovering one or several vulnerabilities associated with the identified COTS products or software products (such as examples identified at https://www.first.org/cvss/v3.0/cvss-v30-examples_v1.5.pdf). Indeed, public CVE dataset comprises information for identifying products or functionalities that are subject to weaknesses due to relevant vulnerabilities. Thus, the server 10 can obtain a list of CVSS parameters which is associated with the analyzed binary. Hence, these parameters may be the same as or similar to CVSS parameters which, when determined and entered manually (by a subjective evaluator), are as the basis by which a CVSS severity score is obtained (e.g., by using a CVSS calculator such as one hosted by First.org, www.first.org/cvss/calculator/3.0). In another embodiment of the disclosure, the server 10 can perform an analysis of the binary by disassembling or decompiling it. Then, some portions of the assembly code can be analyzed in order to identify a specific function (such as management of Bluetooth packets, use of OpenSSL, etc.). Then, a list of vulnerabilities that could be comprised in the binary are generated. However, an additional indicator is provided for each identified vulnerability in the list for indicating that it just a potential threat and not a certainty. In another variant, in order for server 10 to extract these CVSS parameters from the binary, server 10 may—in some examples—use combined (e.g., or 'merged') common vulnerability and exposures (CVE) datasets (e.g., a public CVE dataset and a private CVE dataset, the latter comprising proprietary historical data acquired and typically stored over a relatively long period of time). By extracting the CVSS parameters from the binary using an algorithm (instead of using merely human subjectivity), the server 10 may provide objective, accurate, and consistent CVSS severity scoring results to its customers in a timely manner. A process of determining such CVSS severity scores will be described in greater detail below following a description of the elements shown in FIGS. 1-2.

FIG. 1 is a schematic diagram illustrating the software vulnerability testing server 10 in communication with multiple customer computers 12 via a communication system 14. The illustrated server 10 may have one or more networked computers 20, 22, 24 in communication with one or more databases 30, 32, 34. Thus, while several computers 20-24 are shown and while several databases 30-34 are shown, these are merely example quantities of computers and databases. The computers 20-24 may be configured to carry out, among other things, the process(es) described herein.

In at least one example, each computer 20-24 is identical; therefore, only one will be described in detail. FIG. 2 is a schematic diagram illustrating an example of networked computer 20. Computer 20 may be any suitable hardware computer module, personal computer, mini-server, or other computing device capable of and configured to execute instructions, such as those described below. Computer 20 may comprise one or more processors 40, 42, 44 and one or more memories 50, 52, 54 (e.g., also called 'memory devices'). Each processor 40-44 may be identical; therefore, only one processor (40) will be described in detail.

Processor 40 may be any type of device capable of processing electronic instructions, non-limiting examples including a microprocessor, a microcontroller or controller, an application specific integrated circuit (ASIC), etc.—just to name a few. Processor 40 may be programmed to execute digitally-stored instructions, which may be stored in memories 50 (and/or 52-54), which enable the computer 20 to, among other things, determine a CVSS severity score by extracting CVSS parameters from a binary. Non-limiting examples of instructions will be described in the one or more processes described below, wherein the order of the instructions set forth below is merely an example unless stated otherwise.

Each memory 50-54 may be identical; therefore, only one memory (50) will be described in detail. Memory 50 may include any non-transitory computer usable or readable medium, which may include one or more storage devices or articles. Exemplary non-transitory computer usable storage devices include conventional hard disk, solid-state memory, random-access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 50 may store one or more computer program products which may be embodied as software, firmware, or other programming instructions executable by the processor(s) 40-44. In addition, memory 50 may store the data associated with an operation of server 10, as described more below.

The data stored on each memory 50, 52, 54 may be identical; or in at least one example, at least some data stored on memory 50 may differ from data stored on memory 52 and/or 54. Furthermore, the quantities of processors and memories shown in FIG. 2 (e.g., three each) are merely examples; any suitable quantity of either may be used.

Returning to FIG. 1, computers 20-24 may be in network communication with the one or more databases 30-34 (as indicated by the bidirectional arrows). In this manner, data files and/or program code may be retrieved from at least one of databases 30-34 and individually or collectively utilized, as needed, by the respective computers 20-24. The hardware of each database 30-34 may be identical; therefore, only one (30) will be described in detail. Database 30 may be any suitable data repository or other data store that comprises various kinds of mechanisms for storing, accessing, and retrieving various kinds of data, including a hierarchical database, a set of files in a file system, an application database in a proprietary format, a relational database management system (RDBMS), etc. Database 30 may comprise a file system, wherein the file system may be accessible using a computer operating system and may include files stored in various formats.

In some examples, databases 30-34 may store identical data. In this manner, one or more computers (e.g., computers 20-22) typically may access database 30, whereas computer 24 typically may access database 32—in this manner, the same information may be available to any computer 20-24 regardless of which database 30-34 the respective computer accesses. In other examples, at least some of the databases 30-34 store different data.

According to one embodiment, at least one of the databases 30-34 stores a private CVE dataset comprising proprietary historical information. As used herein, a CVE dataset refers to a list of entries for cybersecurity vulnerabilities, wherein each entry on the list comprises an identifier (e.g., an identification number), a description of a previously-determined vulnerability, and at least one available reference regarding the previously-determined vulnerability. In at least one example, the data of the private CVE dataset is stored and organized similarly to a public CVE dataset (e.g., a publicly-available CVE dataset) except that the data is proprietary to the server 10 (e.g., its company) and thus is not publicly available. A non-limiting example of a public CVE dataset is the MITRE database (https://cve.mitre.org/). Thus, it should be appreciated that while some vulnerabilities are known to the public, server 10 may store (e.g., via databases 30-34) trade secret and other proprietary information pertaining to vulnerabilities determined through private research and development (R&D), other private project development, or the like. Furthermore, such private CVE datasets may comprise information compiled over a relatively long period of time (e.g., more than two years, more than five years, more than ten years, etc.). In a variant, the private CVE dataset comprises code instructions or portion of code associated with the vulnerability. Hence, when the server 10 performs an analysis of a binary, it tries to identify the same or close code instructions or portion of code of the vulnerability into it. Once identified, the corresponding CVSS parameters can be used.

In some examples, to increase computational efficiency, databases 30-32 may store public CVE datasets as well. Alternatively, or in addition thereto, computers 20-24 may access public CVE datasets using a publicly-accessible remote database 60—e.g., via communication system 14. According to one example, remote database 60 is a repository or data store hosted by MITRE or the like. Of course, other organizations may offer similar services and be accessed by computers 20-24 of server 10.

Turning now to customer computers 12, such computers 12 are merely intended to illustrate any suitable computing device used by third parties—e.g., third parties which develop enterprise software, software-as-a-service (SAAS), integrated software (e.g., for computer hardware modules or electronic circuits), or the like. Such computers 12 may be configured to compile source code into a binary, upload the binary to server 10 via a communication link 70, and later receive a CVSS severity score regarding the same. Further, as will be shown in one example, a respective computer 12 may be able to access a report (e.g., which may be in the form of a graphical user interface (GUI) or the like) providing additional information regarding the CVSS severity score. Thus, while three third party computers are shown, any suitable quantity of customer computers 12 may be serviced by server 10.

FIG. 1 also illustrates communication system 14 which serves as a communication link between, among other things, server 10 and computers 12. System 14 may be any suitable wired and/or wireless communication system—e.g., representing network connections and infrastructure to facilitate the same. For example, communication system 14 can enable connectivity to public switched telephone network (PSTN) such as that used to provide hardwired telephony, packet-switched data communications, internet infrastructure, and the like. Alternatively, or in addition thereto, communication system 14 may include satellite communication architecture and/or may include cellular telephone communication over wide geographic region(s). Thus, in at least one example, system 14 may include any suitable cellular infrastructure that could include eNodeBs, serving gateways, base station transceivers, and the like. Further, system 14 may utilize any suitable existing or future cellular technology (e.g., including LTE, CDMA, GSM, etc.).

Figure 3:
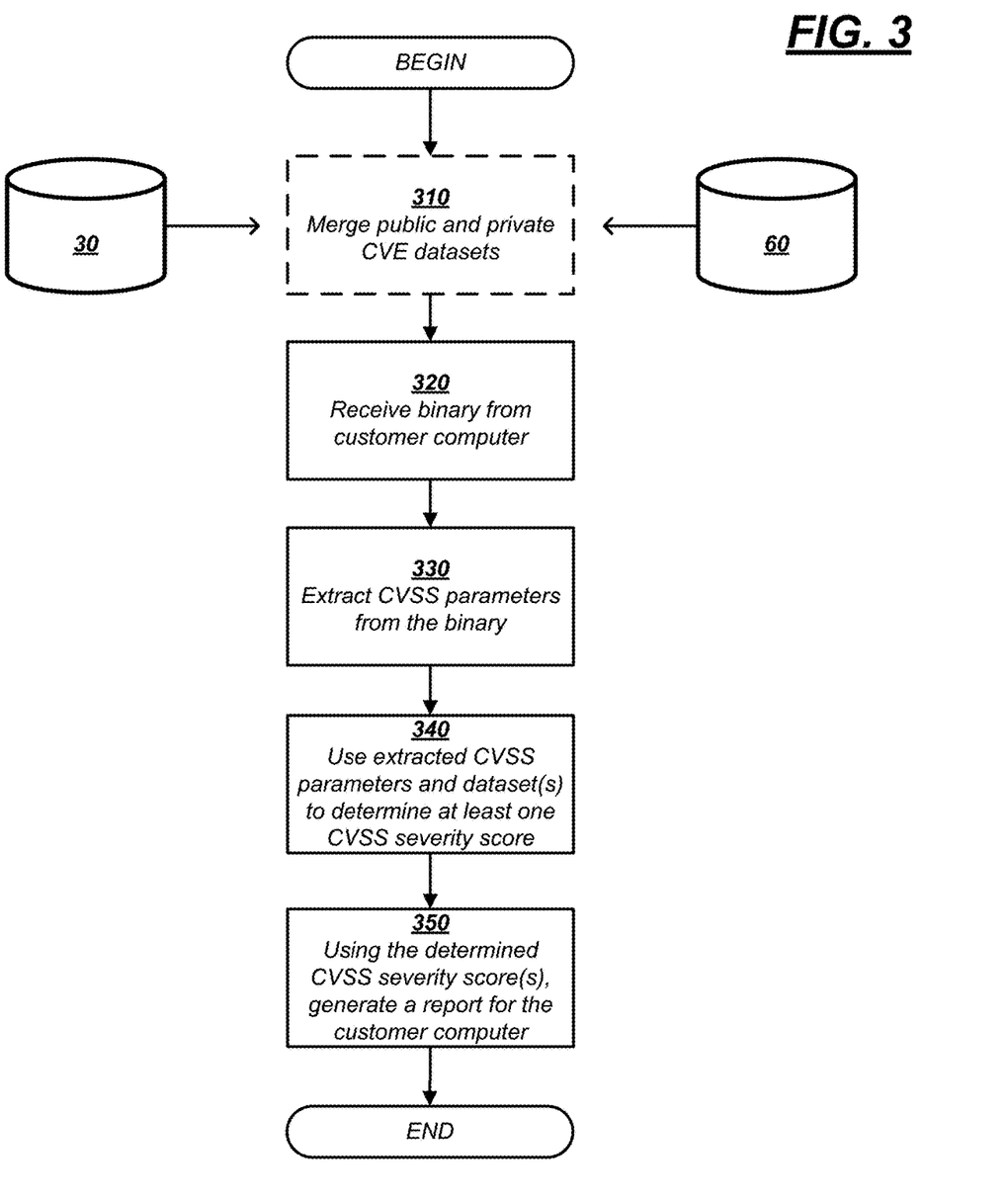
FIG. 3 is a flow diagram illustrating a process of determining a common vulnerability scoring system (CVSS) score for a binary provided to the server from one of the customer computers.

Turning to FIG. 3, a flow diagram illustrating a process 300 of determining at least one common vulnerability scoring system (CVSS) severity score for a binary provided to the server 10 from one of the customer computers 12. CVSS severity scores may include a base score, a temporal score, and/or an environment score, as those terms are used in the art (e.g., as defined by the First.org Specification, https://www.first.org/cvss/specification-document). The process 300 may be executed by at least one of the computers 20-24 (e.g., by computer 20)—e.g., by one or more of processors 40-42—and using instructions stored on at least one memory 50-54. The process 300 may begin with block 310.

In block 310, computer 20 optionally may merge a public CVE dataset (e.g., from data stored in remote database 60) with a private CVE dataset (e.g., comprising data stored in at least one of databases 30-34 (e.g., in database 30)). Merging the public and private CVE datasets may include appending or prepending the private CVE dataset to the public CVE dataset(s). In some examples, the public and private CVE datasets may be interstitially-integrated with one another (e.g., by category, by type, by description, by reference, etc.). By increasing the amount of potential vulnerability data, it may be expected that a consequently-calculated CVSS severity score (using the combined or merged public and private CVE datasets) may have increased accuracy and/or a more detailed justification as to how and/or why that particular CVSS severity score was determined. Block 310 may continue to occur (e.g., following block 320 or other blocks); further, merging may occur repeatedly between execution of process 300 or during it.

In block 320 which may follow, server 10 (and computer 20) may receive from customer computer 12 a binary for evaluation. Computer 20 may receive such a binary via communication system 14; in other examples, the binary may be stored on a memory device (e.g., such as a flash drive or CD-ROM) and mailed or otherwise provided to a user of computer 20, which user then may upload the binary into computer 20. In at least some examples, the binary may be in an executable and linkable format (ELF), a portable executable (PE) format, or the like.

In block 330 which may follow, computer 20 may analyze the binary and thereby extract CVSS parameters from the binary. More precisely, once a potential identified vulnerability has been detected, the corresponding CVSS parameters are provided. For example, CVSS parameters that are associated with a base score may include: an attack vector (AV), an attack complexity (AC), a privileges required (PR), a user interaction (UI), a scope (S), a confidentiality (C), an integrity (I), and an availability (A). Further, for example, CVSS parameters that are associated with a temporal score may include: an exploit code maturity (E), a remediation level (RL), and a report confidence (RC). Further, for example, CVSS parameters that are associated with an environmental score may include: a confidentiality requirement (CR), an integrity requirement (IR), an availability requirement (AR), a modified attack vector (MAV), a modified attack complexity (MAC), a modified privileges required (MPR), a modified user interaction (MUI), a modified scope (MS), a modified confidentiality (MC), a modified integrity (MI), and a modified availability (MA). As these CVSS parameters are known in the art (e.g., see https://www.first.org/cvss/specification-document), these will not be explained in detail herein. Examples of determinable values for each of exemplary CVSS parameters are shown in Table I; in other examples, more or fewer CVSS parameters (including CVSS parameters uniquely used by server 10) may be used. Further, it should be appreciated that in some implementations of block 330 the extracted CVSS parameters may include at least some of those described herein, as well one or more different CVSS parameters.

TABLE I

| CVSS Parameters | | | | |
|---|---|---|---|---|
| Base Score | | | | |
| Attack Vector (AV) | | | | |
| | Network (N) | Adjacent (A) | Local (L) | Physical (P) |
| Attack Complexity (AC) | | | | |
| | Low (L) | High (H) | | |
| Privileges Required (PR) | | | | |
| | None (N) | Low (L) | High (H) | |
| User Interaction (UI) | | | | |
| | None (N) | Required (R) | | |
| Scope (S) | | | | |
| | Unchanged (U) | Changed (C) | | |
| Confidentiality (C) | | | | |
| | None (N) | Low (L) | High (H) | |
| Integrity (I) | | | | |
| | None (N) | Low (L) | High (H) | |
| Availability (A) | | | | |
| | None (N) | Low (L) | High (H) | |
| Temporal Score | | | | |
| Exploit Code Maturity (E) | | | | |
| | Not Defined (X) | Unproven (U) | Proof-of-Concept (P) | Functional (F) | High (H) |
| Remediation Level (RL) | | | | |
| | Not Defined (X) | Official Fix (O) | Temporary Fix (T) | Workaround (W) | Unavailable (U) |
| Report Confidence (RC) | | | | |
| | Not Defined (X) | Unknown (U) | Reasonable (R) | Confirmed (C) |
| Environmental Score | | | | |
| Confidentiality Requirement (CR) | | | | |
| | Not Defined (X) | Low (L) | Medium (M) | High (H) |
| Integrity Requirement (IR) | | | | |
| | Not Defined (X) | Low (L) | Medium (M) | High (H) |

TABLE I-continued

| CVSS Parameters | | | | | |
|---|---|---|---|---|---|
| Availability Requirement (AR) | Not Defined (X) | Low (L) | Medium (M) | High (H) | |
| Modified Attack Vector (MAV) | Not Defined (X) | Network (N) | Adjacent Network (AN) | Local (L) | Physical (P) |
| Modified Attack Complexity (MAC) | Not Defined (X) | Low (L) | High (H) | | |
| Modified Privileges Required (MPR) | Not Defined (X) | None (N) | Low (L) | High (H) | |
| Modified User Interaction (MUI) | Not Defined (X) | None (N) | Required (R) | | |
| Modified Scope (MS) | Not Defined (X) | Unchanged (U) | Changed (C) | | |
| Modified Confidentiality (MC) | Not Defined (X) | None (N) | Low (L) | High (H) | |
| Modified Integrity (MI) | Not Defined (X) | None (N) | Low (L) | High (H) | |
| Modified Availability (MA) | Not Defined (X) | None (N) | Low (L) | High (H) | |

Figure 4:
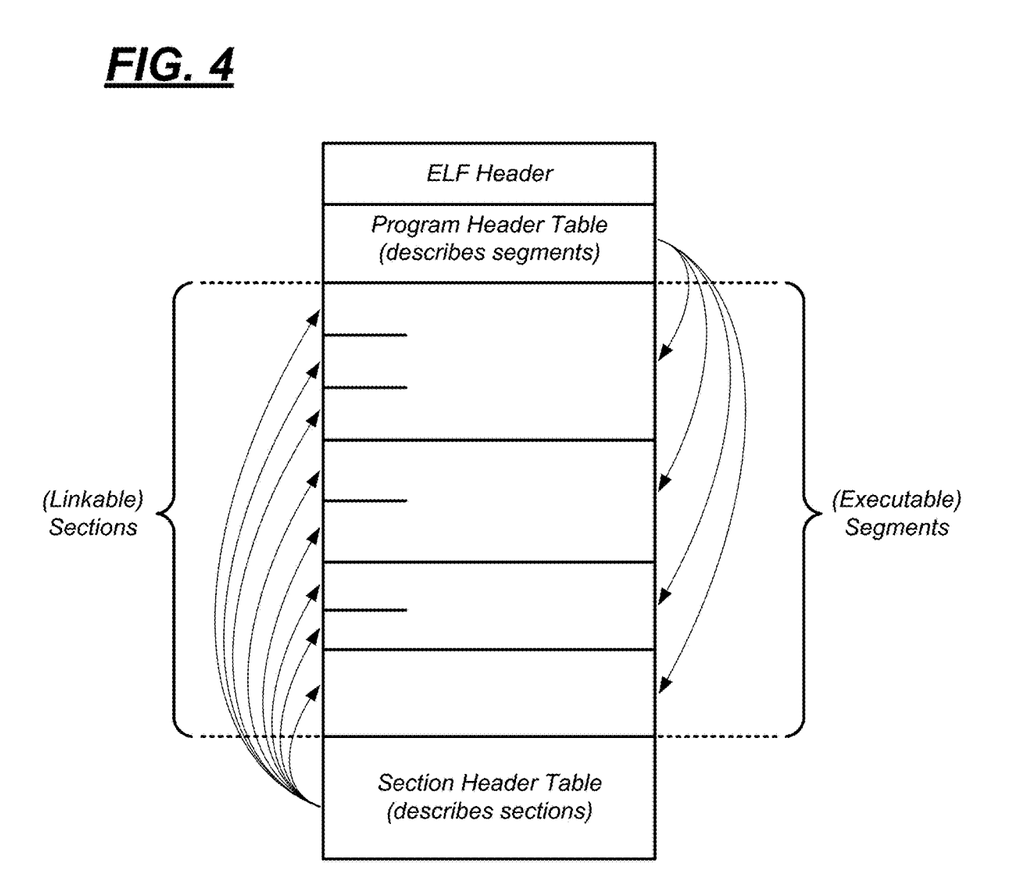
FIG. 4 is a diagram illustrating an example of an executable and linkable format (ELF) which may be used in the process shown in FIG. 3.

To illustrate a non-limiting example of block 330, the computer 20 may analyze sequence(s) of 0's and 1's in an exemplary binary by disassembling it or by decompiling it. As used herein, either of disassembly (or disassembling) or decompilation (decompiling) refer to generating a source code (or portion of source code) from a binary. The source code outputted by disassembling a binary is an assembly source code. However, the source code outputted by decompiling a binary is a high level language source code (for example a source code in C language, etc.). Usually, a decompiler (that performs the decompiling of a binary) relies on a disassembler. Portions of source code may comprise one or more segments, one or more sections, or one or more symbols, wherein a segment comprises multiple sections, wherein a section comprises multiple symbols, wherein a symbol is a unique name of a source code function call, and wherein a function call may be a static function call (those linked after compiling) or a dynamic function call (those linked during compiling). In the following, examples are described with the obtention of source code by disassembling a binary, but the use of a decompiler can be also done for obtaining a source code. FIG. 4 illustrates a non-limiting example of an ELF comprising the portions of source code recited above. According to an example, computer 20 may perform disassembly by utilizing a disassembly algorithm; non-limiting examples of commercial implementations of such a disassembly algorithm include Interactive Disassembler (IDA) Pro, Dyninst, Binary Analysis Platform (BAP), and ByteWeight. Of course, these are merely examples; other disassembly algorithm implementations may be used.

Continuing with the non-limiting example of block 330, once at least partially disassembled or decompiled, computer 20 may evaluate the source code or one or more source code portions to determine CVSS parameter values for the respective binary. In at least one example, based on the disassembly or decompilation, the computer 20 identifies and evaluates one or more function calls. This evaluation may include mapping attributes of the source code or source code portion(s) to each of the CVSS parameters (e.g., in some instances, multiple source code portions may be evaluated to determine at least some of the CVSS parameters). For illustration purposes only, the computer 20 may determine the following exemplary values: for the base score (AV=A, AC=L, PR=N, UI=R, S=U, C=L, I=L, and A=H), for the temporal score (E=H, RL=O, and RC=U), and for the environmental score (CR=H, IR=M, AR=M, MAV=N, MAC=L, MPR=L, MUI=X, MS=U, MC=L, MI=L, and MA=N). Again, these determined values are merely examples for illustrative and explanatory purposes herein. It is to be expected that depending on the binary, at least some of these values will differ. According to at least one embodiment, sequences and features of the instant binary may be similar to previously analyzed binaries. Thus, determination of the values for the CVSS parameters may be based on past analyses. Of course, other processes for determining the CVSS parameter values using the binary are also possible.

Block 340 follows. Once computer 20 has extracted or otherwise determined values for the CVSS parameters using the binary, computer 20 may use a CVSS calculation algorithm to determine a CVSS severity score. In at least one embodiment, the CVSS calculation algorithm is similar to or the same as that used by First.org (e.g., see https://www.first.org/cvss/calculator/3.0). Of course, in one example, the basis of the severity score is the merged private and public CVE datasets (resulting from block 310). Continuing with the example above (e.g., using those values), the computer 20 may determine at least one CVSS severity score (e.g., at least one of a base score, a temporal score, an environmental score, or other suitable score). For example, using the exemplary values in the illustrative example above, computer 20 may determine: a base score=5.5 ('medium vulnerability'), a temporal score=4.9 ('medium vulnerability'), and an environmental score=4.6 ('medium vulnerability'). It will be appreciated that when different values are extracted from the binary (and then provided as input to the CVSS calculation algorithm), different CVSS severity scores may result. Thus, these scores are merely an example.

Figure 5:
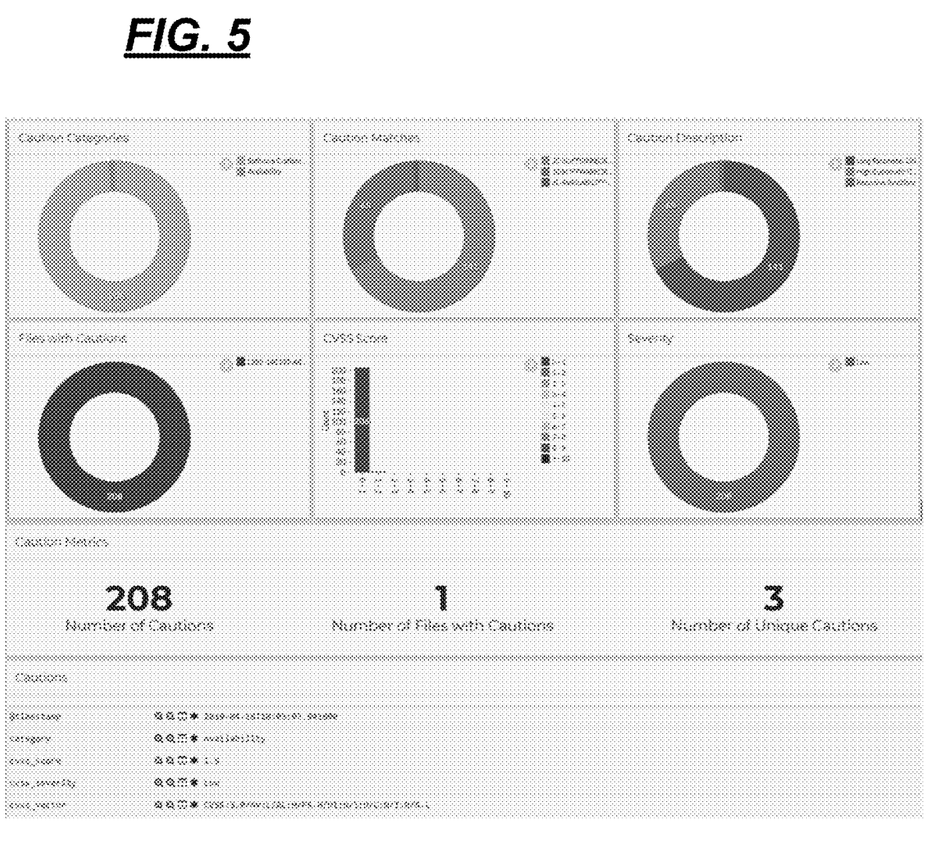
FIG. 5 is a diagram illustrating an example of a report for a customer computer.

In block 350 which may follow, computer 20—using the determined CVSS severity score(s)—may generate a report for the customer computer 12. According to an example, the report may comprise one or more webpages or computer files providing a GUI, such as the one shown in FIG. 5. For example, the report may indicate one or more caution categories, one or more caution matches, one or more caution descriptions, one or more files with cautions, an overall CVSS severity score, and a severity value. Furthermore, in some instances, the report may indicate a quantity of cautions, a quantity of files with cautions, a quantity of unique cautions, or the like. Other data may be included in the report such as a timestamp, a category, a CVSS vector value (e.g., based on the CVSS parameter values), etc. In some embodiments, the report may be color-coded to provide a visual representation to the user regarding the code's vulnerability (e.g., shades of green indicating less vulnerability, shades of yellow indicating some vulnerability, and shades of red indicating even greater vulnerability). Any of the report embodiments may be used singly or in combination with one another. Furthermore, the report may be interactive in some instances—e.g., enabling a user of the customer computer 12 to select portions thereof and the report, in response, may offer additional CVSS vulnerability information.

Block 350 may comprise server 10 communicating the report to customer computer 12 via communication system 14, computer 12 accessing the report via server 10, or any other suitable report delivery technique. Following block 350, the process 300 may end.

It should be appreciated that the private CVE dataset may evolve over time. Thus, the disclosure above contemplates future merges of new information from the private CVE dataset with the information of block 310—or simply a re-merge of an entirety of the private CVE dataset with an updated or most recent public CVE dataset. In this manner, the process 300 discussed above repeatedly be trained and improved.

Thus, there has been described a server and a process executable by that server. The process includes receiving—at the server—a binary from a computer, determining from the binary a plurality of CVSS parameters, and the providing a report to the computer. The report includes a CVSS severity score so that the computer may learn a risks and vulnerabilities associated with the binary.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

An Abstract is provided herein to allow the reader to quickly ascertain the nature of the technical disclosure. It is submitted with the understanding that it will not be used to limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A computer-implemented method of determining a severity score, comprising:
   receiving, at a server, a binary;
   determining, by the server, a plurality of vulnerability parameters of the binary, wherein the determining comprises:
      disassembling or decompiling, by the server, the binary to generate a source code corresponding to the binary;
      identifying, by the server, one or more function calls in the source code;
      determining, by the server, the plurality of vulnerability parameters based on the one or more function calls; and determining, by the server, the severity score based on the plurality of vulnerability parameters; and generating, by the server, a report based on the plurality of vulnerability parameters.

2. The method of claim 1, wherein the severity score is a common vulnerability scoring system (CVSS) severity score.

3. The method of claim 1, further comprising: merging a public common vulnerability and exposures (CVE) dataset with a private CVE dataset; and based on the plurality of vulnerability parameters, using the merged public and private CVE datasets to determine a common vulnerability scoring system (CVSS) severity score.

4. The method of claim 1, wherein the vulnerability parameters include an attack vector (AV), an attack complexity (AC), a privileges required (PR), a user interaction (UI), a scope (S), a confidentiality (C), an integrity (I), and an availability (A).

5. The method of claim 1, wherein the vulnerability parameters include an exploit code maturity (E), a remediation level (RL), and a report confidence (RC).

6. The method of claim 1, wherein the vulnerability parameters include a confidentiality requirement (CR), an integrity requirement (IR), an availability requirement (AR), a modified attack vector (MAV), a modified attack complexity (MAC), a modified privileges required (MPR), a modified user interaction (MUI), a modified scope (MS), a modified confidentiality (MC), a modified integrity (MI), and a modified availability (MA).

7. A server, comprising:

at least one hardware processor; and one or more memories coupled to the at least one hardware processor and storing programming instructions for execution by the at least one hardware processor to cause the server to:

receive a binary;

determine a plurality of vulnerability parameters of the binary, wherein the programming instructions, when executed by the at least one hardware processor, cause the server to:

disassemble or decompile the binary to generate a source code corresponding to the binary;

identify one or more function calls in the source code;

determine the plurality of vulnerability parameters based on the one or more function calls; and determine a severity score based on the plurality of vulnerability parameters; and generate a report based on the plurality of vulnerability parameters.

8. The server of claim 7, wherein the severity score is a common vulnerability scoring system (CVSS) severity score.

9. The server of claim 7, wherein the programming instructions, when executed by the at least one hardware processor, cause the server to: merge a public common vulnerability and exposures (CVE) dataset with a private CVE dataset; and based on the plurality of vulnerability parameters, use the merged public and private CVE datasets to determine a common vulnerability scoring system (CVSS) severity score.

10. The server of claim 7, wherein the vulnerability parameters include an attack vector (AV), an attack complexity (AC), a privileges required (PR), a user interaction (UI), a scope (S), a confidentiality (C), an integrity (I), and an availability (A).

11. The server of claim 7, wherein the vulnerability parameters include an exploit code maturity (E), a remediation level (RL), and a report confidence (RC).

12. The server of claim 7, wherein the vulnerability parameters include a confidentiality requirement (CR), an integrity requirement (IR), an availability requirement (AR), a modified attack vector (MAV), a modified attack complexity (MAC), a modified privileges required (MPR), a modified user interaction (MUI), a modified scope (MS), a modified confidentiality (MC), a modified integrity (MI), and a modified availability (MA).

\* \* \* \* \*